Figure 1:
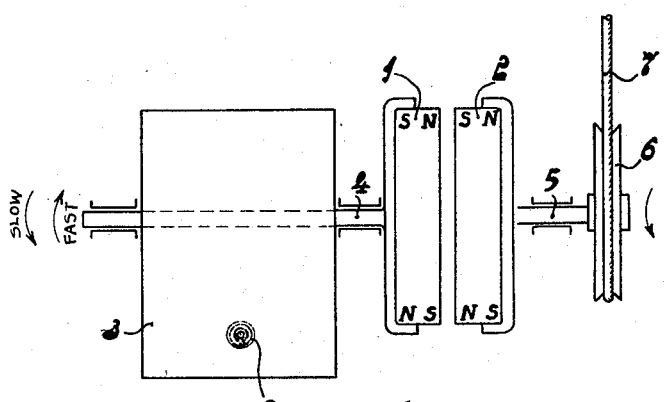

Oct. 21, 1958    J. M. CLUWEN    2,857,538
ARRANGEMENT FOR CONVERTING A TANGENTIALLY OSCILLATING
MOVEMENT ABOUT A SHAFT INTO A ROTATIONAL
MOVEMENT IN ONE DIRECTION
Filed Oct. 4, 1955

INVENTOR
JOHANNES MEYER CLUWEN
BY
AGENT

United States Patent Office 2,857,538
Patented Oct. 21, 1958

2,857,538

ARRANGEMENT FOR CONVERTING A TANGENTIALLY OSCILLATING MOVEMENT ABOUT A SHAFT INTO A ROTATIONAL MOVEMENT IN ONE DIRECTION

Johannes Meyer Cluwen, Eindhoven, Netherlands, assignor, by mesne assignments, to North American Philips Company, Inc., New York, N. Y., a corporation of Delaware Application October 4, 1955, Serial No. 538,371

Claims priority, application Netherlands October 8, 1954

2 Claims. (Cl. 310—103)

This invention relates to arrangements for converting a tangentially oscillating movement about a shaft into a rotational movement in one direction. Such a conversion of movement is generally used, for example, in those cases in which one extremity of a driving rod is connected to a crank shaft whereas the other extremity performs a tangentially oscillating movement about a shaft. Examples of such uses are the drive of a treadle sewing-machine and a boy's racer.

According to the invention, the arrangement comprises a magnetic synchronous coupling, in which the driving part performs a tangential oscillation about a shaft, the oscillating movement in the direction opposite to the direction of rotation of the part to be driven being considerably more rapid than that in the direction of rotation of the part to be driven so that the two parts are coupled during the slow movement of the driving part but slip during the rapid movement of the driving part.

The above-mentioned arrangement may advantageously be used, for example, for driving a treadle sewing-machine in which the foot-operated member is coupled directly to the driving part of the synchronous coupling. The part to be driven thus rotates in one direction, when the oscillation of the foot-operated member in the direction opposite to the direction of rotation is performed more rapidly than that in the opposite direction. After some exercise, operating properly with the feet will prove to be not more difficult than the operation used in treadle sewing-machines of the conventional type.

The arrangement according to the invention affords the advantage that the ports of the synchronous coupling are only magnetically coupled periodically, so that the loss of energy due to friction is at a minimum. During the slipping of the parts with respect to one another, these parts are decoupled substantially completely, that is to say a moment is not transferred from one part to the other. This also implies a reduction of the frictional losses which occur in known arrangements. Furthermore as a result of its simple mechanical structure, the arrangement according to the invention requires less maintenance than those of known type.

In the invention an advantageous use is thus made of a known property of magnetic synchonous couplings, viz. that such couplings in case of slip substantially do not transfer any couple. The oscillatory movement of the driving part in the direction opposite the direction of rotation is thus readily performed and so-to-say automatically more rapidly than the movement in the opposite direction, since in the latter case the driven part is not coupled, that is to say occupies a freely movable position.

Figure 2:
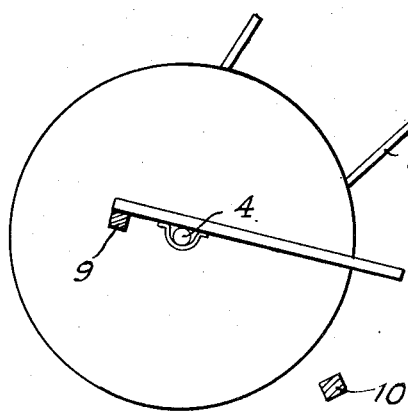

In order that the invention may be readily carried into effect, it will now be described, by way of example, with reference to the accompanying drawing in which:

Fig. 1 is a diagrammatic front view of the device embodying the present invention and, Fig. 2 is a side view thereof.

The figures show a magnetic synchronous coupling used in the drive of a treadle sewing-machine. Parts 1 and 2 of the coupling each comprise a disc-shaped magnetic circuit of permanent-magnetic material in which poles N and S magnetised in the axial direction produce a magnetic field of alternately varying direction as measured along a pitch circle. By way of a driving shaft 4, part 1 is connected directly to a treadle 3, which is driven by the feet and performs a tangentially oscillating movement about the shaft 4. The deflection of the oscillation of the treadle 3 may be limited, for example in both directions, by means of stops 9 and 10. The part 2 is associated with a pulley 6 which is arranged on a driven shaft 5 and which may be coupled, by way of a cord 7, to a fly-wheel, for example of a sewing-machine. As is common practice in sewing-machines of known type, the fly-wheel and hence the part 2 can at first be moved by hand in the proper direction of rotation before the treadle 3 is set into motion, so that during the drive the proper direction of rotation of the machine is ensured.

By providing for the treadle 3 to project through different lengths on each side of the shaft 4, it may in addition be ensured that the oscillatory movement in one direction is readily performed more rapidly than that in the other direction. It is also possible for the treadle 3 to be connected to the device by means of a spring 8, the deflection of the oscillation of the treadle 3 thus being automatically limited, while the spring 8 may provide for the rapid movement of the treadle during the slipping of the parts 1 and 2.

What is claimed is:

1. A magnetic device for converting tangentially oscillating movement about a shaft into rotational movement in one direction comprising a magnetic synchronous coupling including a driving part and a driven part, means for producing oscillatory movement of said driving part which is more rapid in one direction than the other direction, said driving part being operatively connected to said means, both said driving and driven parts being constituted of permanent magnetic material magnetised in the direction of the axes of said parts in which poles of alternating polarity as measured along a pitch circle are present whereby said driving and driven parts are coupled during the slow movement of said driving part and slip relative to each other during the rapid movement of said driving part.

2. A magnetic device for converting tangentially oscillating movement about a shaft into rotational movement in one direction as claimed in claim 1 further providing stop means for limiting the deflection of the oscillation of said driving part.

References Cited in the file of this patent

UNITED STATES PATENTS

| 2,471,947 | Giannini | May 31, 1949 |
| 2,705,762 | Pile | Apr. 5, 1955 |